(12) United States Patent
Cao

(10) Patent No.: US 11,079,000 B2
(45) Date of Patent: Aug. 3, 2021

(54) DIFFERENTIAL CAPABLE OF AUTOMATICALLY RESTRICTING DIFFERENTIAL RATIO AND INCREASING TORQUE

(71) Applicant: Hong Cao, Sichuan (CN)

(72) Inventor: Hong Cao, Sichuan (CN)

(*) Notice: Subject to any disclaimer, the term of this patent is extended or adjusted under 35 U.S.C. 154(b) by 0 days.

(21) Appl. No.: 17/264,803

(22) PCT Filed: Sep. 25, 2018

(86) PCT No.: PCT/CN2018/107384
§ 371 (c)(1),
(2) Date: Jan. 30, 2021

(87) PCT Pub. No.: WO2020/037764
PCT Pub. Date: Feb. 27, 2020

(65) Prior Publication Data
US 2021/0199184 A1 Jul. 1, 2021

(30) Foreign Application Priority Data
Aug. 23, 2018 (CN) .......................... 201810969749.5

(51) Int. Cl.
*F16H 48/20* (2012.01)
*F16H 48/08* (2006.01)
*F16H 48/10* (2012.01)
*F16H 48/24* (2006.01)

(52) U.S. Cl.
CPC .............. *F16H 48/20* (2013.01); *F16H 48/08* (2013.01); *F16H 2048/202* (2013.01)

(58) Field of Classification Search
CPC .......... F16H 48/20; F16H 48/06; F16H 48/08; F16H 2048/202; F16H 48/10; F16H 48/12; F16H 48/24
See application file for complete search history.

(56) References Cited

U.S. PATENT DOCUMENTS

| | | | |
|---|---|---|---|
| RE34,209 E * | 3/1993 | McGarraugh | F16H 3/721 475/84 |
| 9,457,656 B2 * | 10/2016 | Ziech | F16H 48/05 |
| 9,746,064 B2 * | 8/2017 | Shoemaker | F16H 48/08 |

(Continued)

FOREIGN PATENT DOCUMENTS

GB 2357816 A * 7/2001 ............. F16H 48/30

OTHER PUBLICATIONS

GB2357816—J Spooner (Apr. 7, 2001) (Year: 2001).*

*Primary Examiner* — Tinh Dang

(57) ABSTRACT

A differential capable of automatically restricting a differential ratio and increasing torque comprises a container. A differential housing is provided in the container. The differential housing is internally provided with a planetary gear, a planetary shaft, a left half axle gear, and a right half axle gear. The planetary gear is provided on the planetary shaft, and the planetary gear engages with the left half axle gear and the right half axle gear, respectively. The differential housing comprises a left housing and a right housing engaging with each other. A ring gear is provided at the outer circumference of an end of the left housing engaging with the right housing, and a bevel ring gear is provided at the outer circumference of an end of the right housing engaging with the left housing.

7 Claims, 6 Drawing Sheets

(56) References Cited

U.S. PATENT DOCUMENTS

2015/0375618 A1* 12/2015 Ziech ..................... B60K 17/16
                                                                475/221
2016/0208900 A1*  7/2016 Shoemaker ......... F16H 57/0483
2020/0208724 A1*  7/2020 Siwko ..................... F16H 3/721

* cited by examiner

DIFFERENTIAL CAPABLE OF AUTOMATICALLY RESTRICTING DIFFERENTIAL RATIO AND INCREASING TORQUE

CROSS-REFERENCE TO RELATED APPLICATION

This application is a national stage of International Application No. PCT/CN2018/107384, filed on Sep. 25, 2018, which claims the priority of Chinese Application No. 201810969749.5, filed on Aug. 23, 2018. Both of the aforementioned applications are hereby incorporated by reference in their entireties.

FIELD OF THE INVENTION

The present disclosure relates to the technical field of differentials, and in particular to a differential capable of automatically restricting a differential ratio and increasing torque.

BACKGROUND OF THE INVENTION

When a vehicle is running, rotational speeds of individual wheels (wheels on both sides of a drive axle and wheels of an all-wheel drive vehicle) are different at the same time in many cases, such as when travelling on a turning road surface, an irregular undulating road surface, etc. In order to solve this problem, the differential appeared. The differential can freely distribute power to left and right wheels running at different speeds or front and rear drive axles.

Since the differential allows the wheels to rotate at different speeds, in a case where the vehicle is travelling on muddy, icy, snowy, or cross-axle road surfaces, when one wheel slips due to reduced road adhesion or idles due to suspension, the power of the vehicle will be ineffectively consumed on the slipping or suspending wheel which is rotating rapidly, and other wheels with road adhesion will lose their power. In this case, the vehicle will not only be unable to move forward, but also will slide down on the slope. In order to overcome the slipping or idling of vehicle wheels, limited slip differentials and differential locks appeared. However, in hardcore off-road vehicles running in a deep off-road environment, the limited slip differentials are not popular due to various reasons such as reliability, and they have not been adopted.

Differential lock: It can rigidly connect two half-axles to make them form an entirety, so that the wheels on both sides can be distributed the same power, thus enabling the vehicle to get out of trouble. This is the function that the differential lock performs. Nowadays, mainstream differential locks include mechanical differential lock (jaw type), classic Jeep Wrangler, Eaton differential lock, and classic Grand Cherokee.

Manual mechanical differential lock (jaw type): The manual mechanical differential lock has simple technology and low production cost, but it is so far still the most reliable and effective drive system equipment to improve the off-road performance of vehicles. It can realize the complete mechanical combination of the power of the two half-axles, which is very firm. However, the differential lock is used only under bad road conditions or extreme conditions, and it will cause serious damage to the tires and other parts of the vehicle when used during normal travelling. For example, Jeep Wrangler Robin Hood and Mercedes-Benz G 500 both use mechanical differential locks. Advantage: In off-road conditions, all wheels of the vehicle can be effectively powered and get out of troubles in severe conditions. Disadvantage: switching has to be made when the speed is lower than 5 Km/H.

Eaton differential lock: Eaton differential lock is also a kind of mechanical differential lock. When there is a difference between the adhesions of the wheels on both sides, if the speed difference between the wheels on both sides reaches a set value, the Eaton differential lock will automatically lock the differential, so that the wheels on both sides can have the same power, thus enabling the vehicle to get out of trouble. Advantage: fully automatic control of locking. Disadvantage: manual control is not possible, and it will take effect only when the speed difference appears, so the reaction speed is slightly slower.

Due to the versatility and economy of wheeled vehicles, people have racked their brains on the improvement and anticipation of the travelling ability of wheeled vehicles. They always hope that a certain load can be towed by the vehicle on various harsh road surfaces or terrains while also running smoothly (such as military travelling, adventure and off-road travelling). The ideal travelling ability of a vehicle should be the manifestation of a perfect combination of continuous traction and kinematic potential energy (accumulation of continuous traction).

Although the differential lock technology is the mainstream technology of the deep off-road vehicle, the Eaton differential lock which realizes automatic control of locking requires a reaction process and time when implementing locking and exiting locking, accompanied by sudden vehicle movement when implementing locking. Implementing locking and exiting locking by the manual mechanical differential lock (jaw type) require a manual switching when the speed is lower than 5 Km/H. Therefore, the differential lock technology has some special requirements on the skills of the vehicle driver, and at the same time, it cannot take advantage of the kinematic potential energy of the vehicle to bring the travelling ability of the vehicle into a better state.

SUMMARY OF THE INVENTION

An object of the embodiments of the present disclosure is to provide a differential capable of automatically restricting a differential ratio and increasing torque, so as to solve the problems of existing differentials and differential locks.

In order to achieve the above object, an embodiment of the present disclosure provides a differential capable of automatically restricting a differential ratio and increasing torque, which includes a case, in which a differential housing is arranged, wherein the differential housing is internally provided with a planetary gear, a planetary shaft, a left half-axle gear and a right half-axle gear; the planetary gear is arranged on the planetary shaft, the planetary gear meshes with the left half-axle gear and the right half-axle gear respectively, and the differential housing includes a left housing and a right housing that fit with each other, and wherein:

a ring gear is arranged at one end of the left housing that fits with the right housing in an outer circumferential direction, the left half-axle gear is arranged in the left housing, a left end of the left half-axle gear is fixedly connected with a left connecting shaft that extends outward, and the left connecting shaft is provided with a left half-axle torque increasing gear and a left half-axle connecting pipe;

a bevel ring gear is arranged at one end of the right housing that fits with the left housing in an outer circumferential direction, the right half-axle gear is arranged in the right housing, a right end of the right half-axle gear is fixedly connected with a right connecting shaft that extends outward, and the right connecting shaft is provided with a right half-axle torque increasing gear and a right half-axle connecting pipe;

the case is also internally provided with a synchronization shaft, which is located outside the differential housing and on the same side of the left half-axle torque increasing gear and the right half-axle torque increasing gear, and which is provided with a synchronization gear which meshes with the ring gear; a left torque increasing free gear and a right torque increasing free gear are respectively provided on left and right sides of the synchronization shaft, wherein the left torque increasing free gear meshes with the left half-axle torque increasing gear, and the right torque increasing free gear meshes with the right half-axle torque increasing gear; the synchronization shaft is also provided with a left two-way overrunning device and a right two-way overrunning device, wherein the left two-way overrunning device is arranged outside the left torque increasing free gear, and the right two-way overrunning device is arranged outside the right torque increasing free gear.

The left half-axle connecting pipe is located outside the left half-axle torque increasing gear, and the left connecting shaft is fixedly connected to a left half-axle through the left half-axle connecting pipe.

A radial power input shaft is also included, and a bevel gear at an end of the radial power input shaft meshes with the bevel gear ring.

The right half-axle connecting pipe is located outside the right half-axle torque increasing gear, and the right connecting shaft is fixedly connected to a right half-axle through the right half-axle connecting pipe.

The left two-way overrunning device and the right two-way overrunning device both include an outer ring, rollers, roller holders, an inner ring, and a lagging direction control disc, wherein the inner ring is fixedly connected to the synchronization shaft, the rollers and the roller holders are all arranged in an annular working gap formed between the inner ring and the outer ring, and the rollers and the roller holders are arranged at intervals; and the lagging direction control disc is arranged on side surfaces of the outer ring and the inner ring and is configured to manage the roller holders and the rollers.

The outer ring of the left two-way overrunning device is fixedly connected with a left end face of the left torque increasing free gear.

The outer ring of the right two-way overrunning device is fixedly connected with a right end face of the right torque increasing free gear.

Embodiments of the present disclosure have the following advantages: the differential capable of automatically restricting a differential ratio and increasing torque provided by the embodiment of the present disclosure will inherit the advantages of the differentials and the differential locks and shield the disadvantages of the differentials and the differential locks. At the moment when power is transmitted to the drive axles and wheel half-axles running at different rotational speeds, if the wheel adhesion to road surface is reduced or becomes zero when the vehicle is travelling on muddy, icy, snowy, or cross-axle road surfaces, the differential will maintain certain rotational speeds of other wheels having road adhesion or drive axle and will transmit automatically increasing torque uninterruptedly and rigidly. Since the change of the working mode of the differential is not limited by speed conditions, the differential does not require reaction time and process and manual manipulation. It can generate continuous traction on various complex road surfaces or alternately changing terrains, and in combination with the kinematic potential energy, can express a new level of travelling ability of wheeled vehicles.

DETAILED DESCRIPTION

The following embodiments are used to illustrate the present disclosure, but not to limit the scope of the present disclosure.

Figure 1:
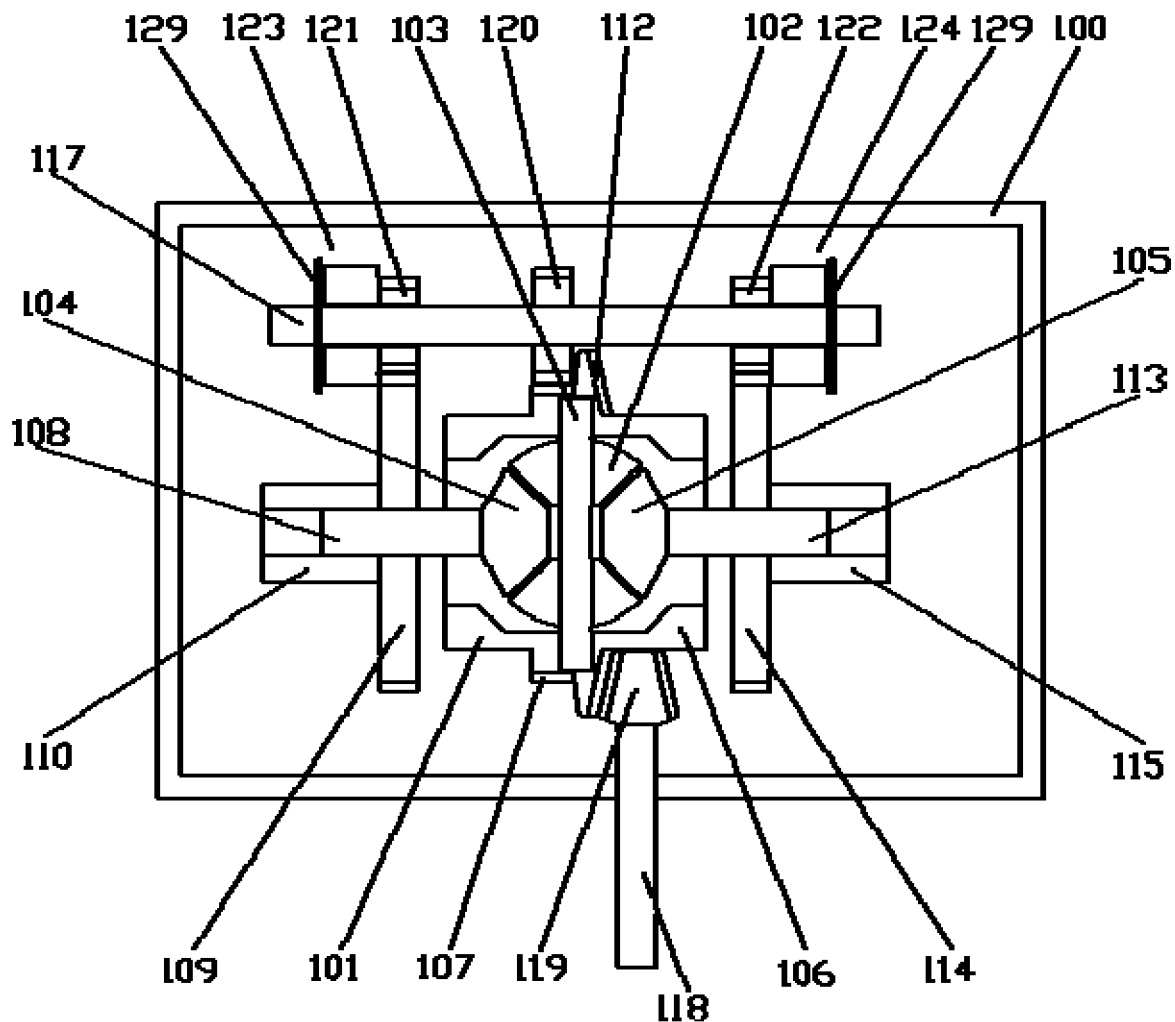
FIG. 1 is a schematic structural view of a differential capable of automatically restricting a differential ratio and increasing torque provided by an embodiment of the present disclosure.
Figure 2:
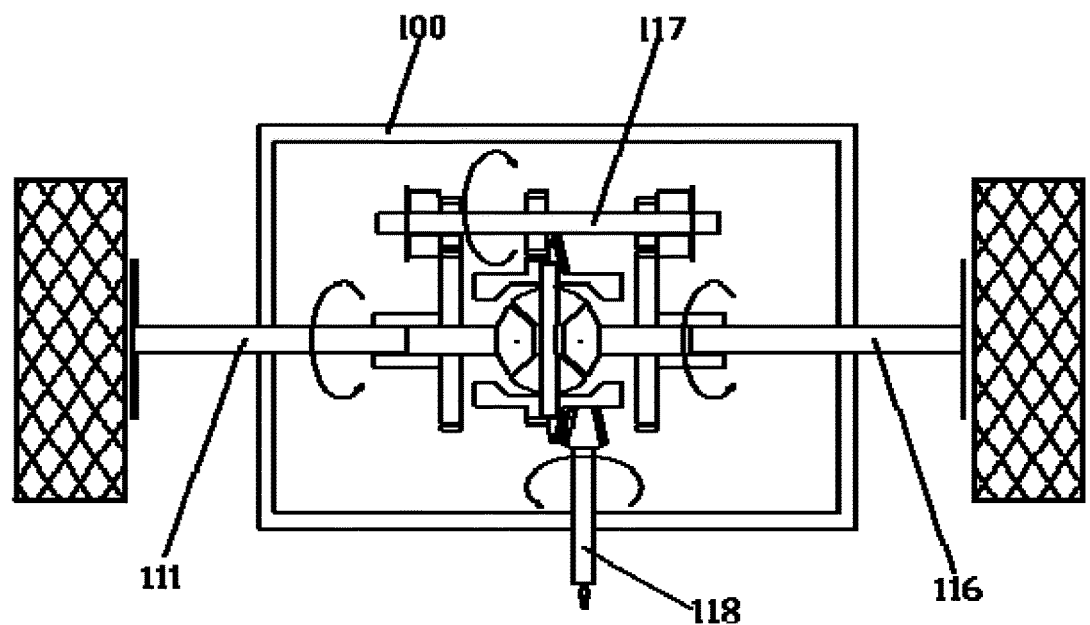
FIG. 2 is a schematic structural view of the differential capable of automatically restricting a differential ratio and increasing torque provided by the embodiment of the present disclosure when fitting with wheels of a rear-axle driving vehicle.
Figure 3:
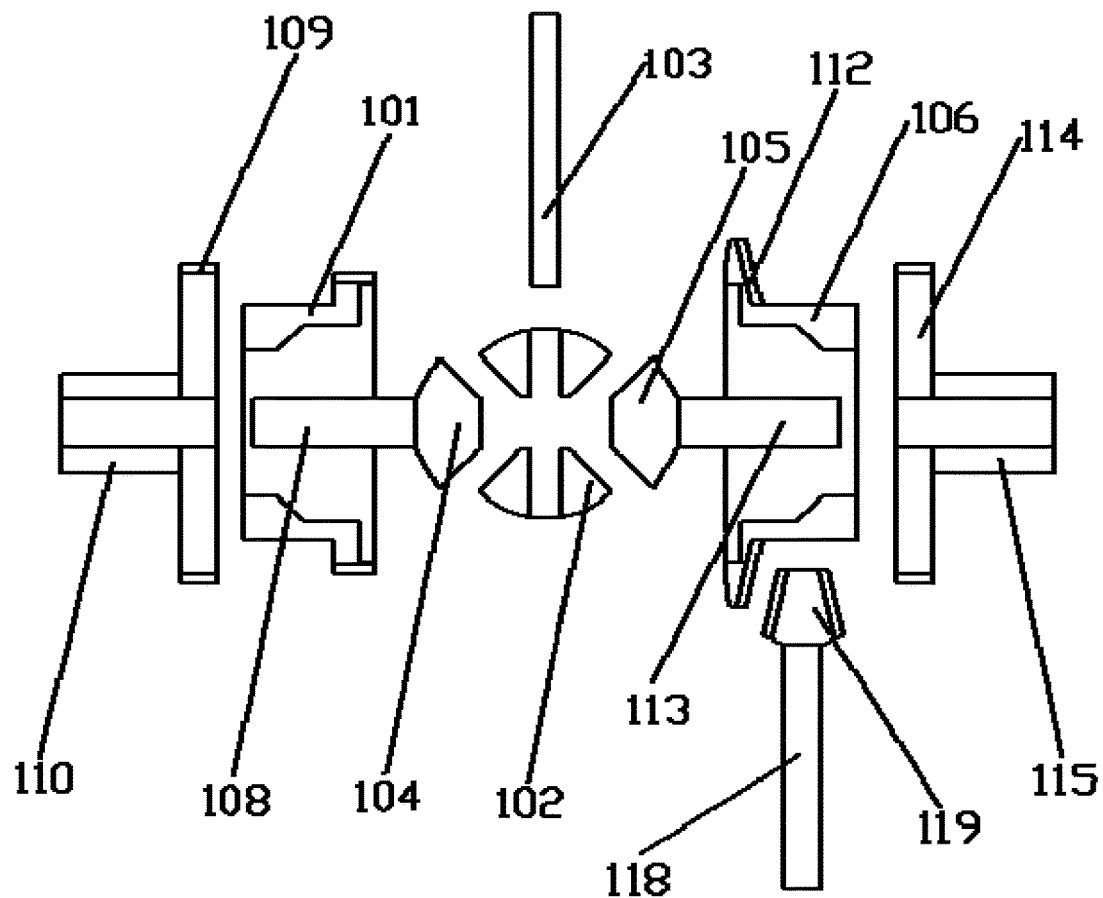
FIG. 3 is a schematic exploded view of the differential capable of automatically restricting a differential ratio and increasing torque provided by the embodiment of the present disclosure with a case and a synchronization shaft removed.
Figure 4:
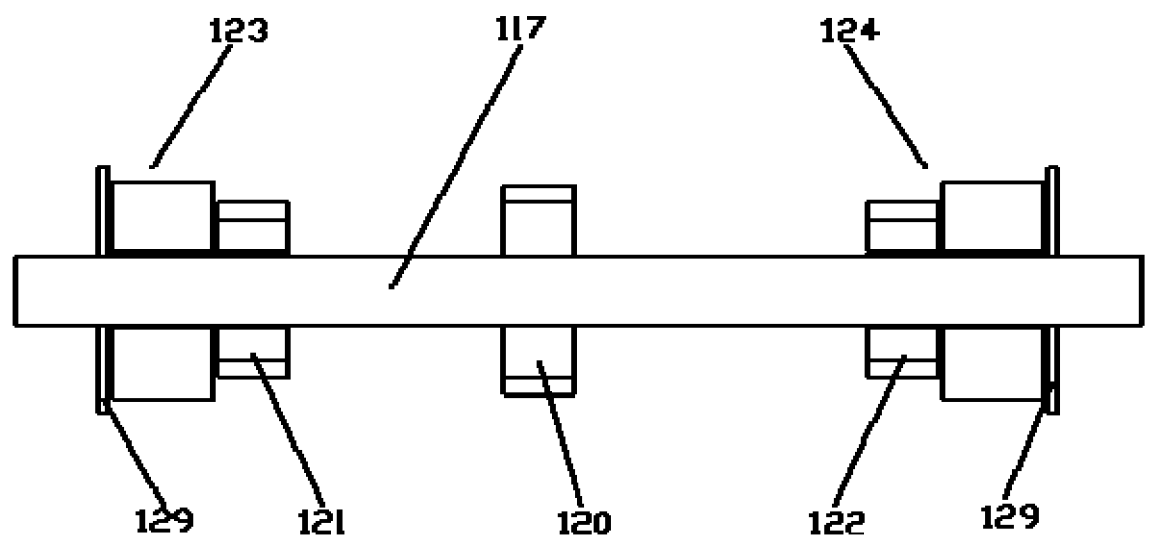
FIG. 4 is a schematic structural view of the differential capable of automatically restricting a differential ratio and increasing torque provided by the embodiment of the present disclosure, in which the synchronization shaft, a synchronization gear, a left torque increasing free gear, a right torque increasing free gear, a left two-way overrunning device, and a right two-way overrunning device are fitted.
Figure 5:
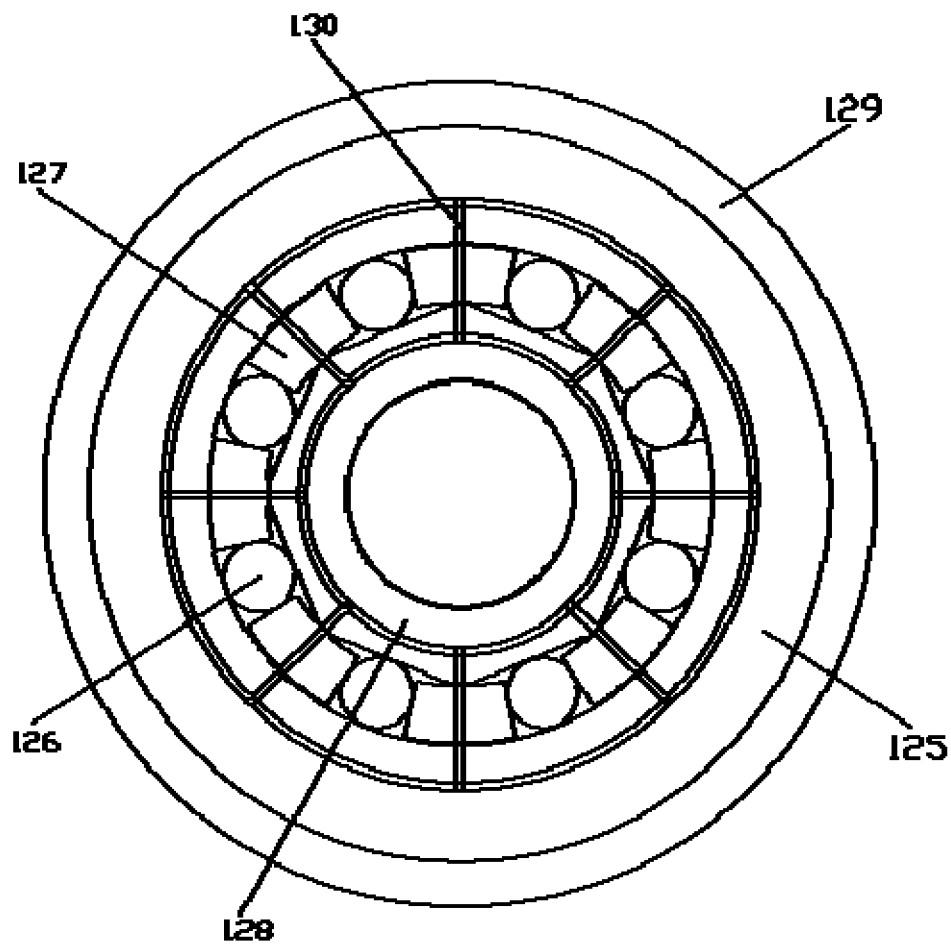
FIG. 5 is a schematic structural view of the left two-way overrunning device or the right two-way overrunning device in the differential capable of automatically restricting a differential ratio and increasing torque provided by the embodiment of the present disclosure.
Figure 6:
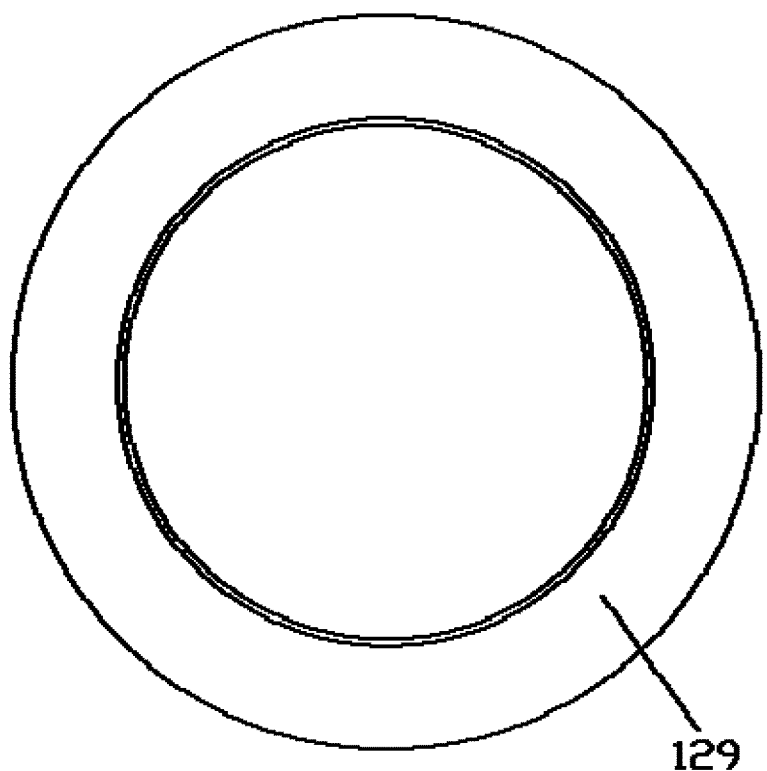
FIG. 6 is a schematic structural view of a lagging direction control disc in the differential capable of automatically restricting a differential ratio and increasing torque provided by the embodiment of the present disclosure.
Figure 7:
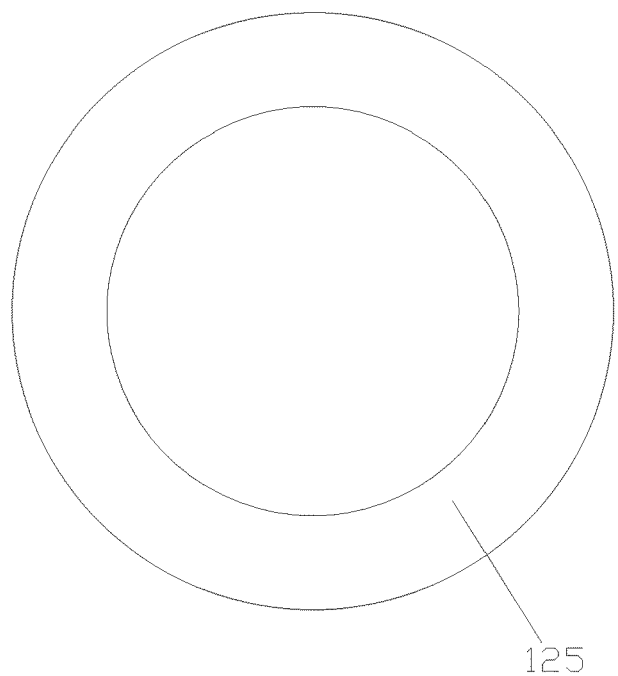
FIG. 7 is a schematic structural view of an outer ring in the differential capable of automatically restricting a differential ratio and increasing torque provided by the embodiment of the present disclosure.
Figure 8:
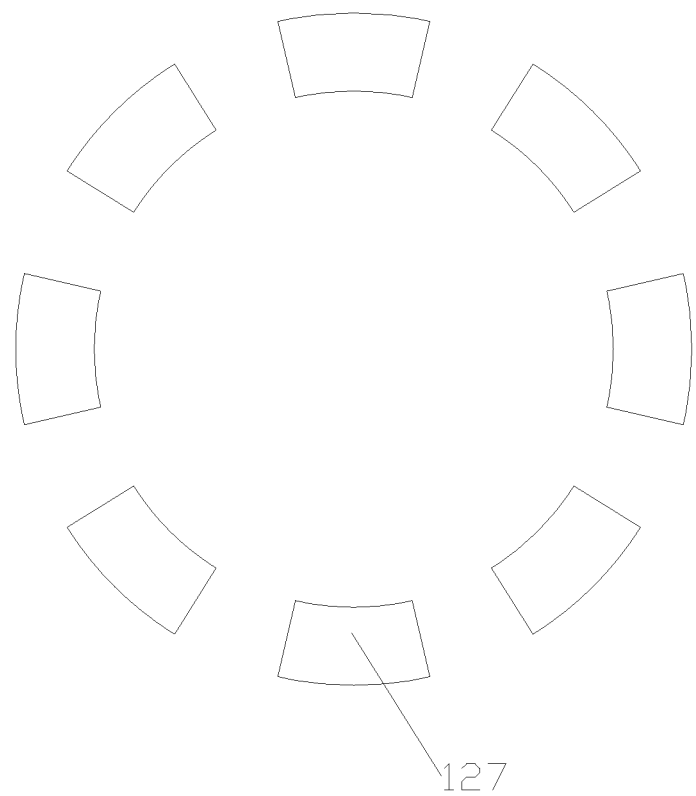
FIG. 8 is a schematic structural view of roller holders in the differential capable of automatically restricting a differential ratio and increasing torque provided by the embodiment of the present disclosure.
Figure 9:
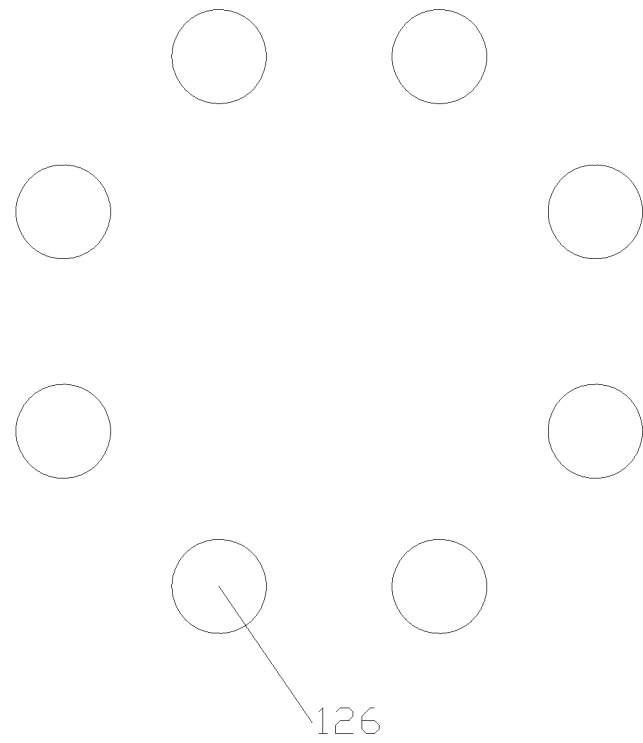
FIG. 9 is a schematic structural view of rollers in the differential capable of automatically restricting a differential ratio and increasing torque provided by the embodiment of the present disclosure.
Figure 10:
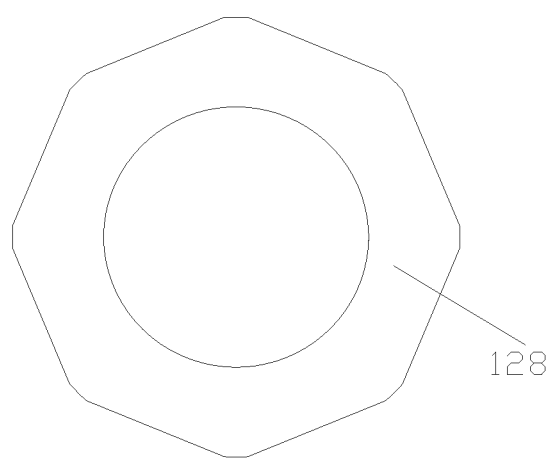
FIG. 10 is a schematic structural view of an inner ring in the differential capable of automatically restricting a differential ratio and increasing torque provided by the embodiment of the present disclosure.

As shown in FIGS. 1 to 10, an embodiment of the present disclosure provides a differential capable of automatically restricting a differential ratio and increasing torque, which includes a case 100, in which a differential housing is arranged, wherein the differential housing is internally provided with a planetary gear 102, a planetary shaft 103, a left half-axle gear 104 and a right half-axle gear 105; the planetary gear 102 is arranged on the planetary shaft 103, the planetary gear 102 meshes with the left half-axle gear 104 and the right half-axle gear 105 respectively, and the differential housing includes a left housing 101 and a right housing 106 that fit with each other, and wherein:

a ring gear 107 is arranged at one end of the left housing 101 that fits with the right housing 106 in an outer circumferential direction, the left half-axle gear 104 is arranged in the left housing 101, a left end of the left half-axle gear 104 is fixedly connected with a left connecting shaft 108 that extends outward, and the left connecting shaft 108 is provided with a left half-axle torque increasing gear 109 and a left half-axle connecting pipe 110;

a bevel ring gear 112 is arranged at one end of the right housing 106 that fits with the left housing 101 in an outer circumferential direction, the right half-axle gear 105 is arranged in the right housing 106, a right end of the right half-axle gear 105 is fixedly connected with a right connecting shaft 113 that extends outward, and the right connecting shaft 113 is provided with a right half-axle torque increasing gear 114 and a right half-axle connecting pipe 115;

the case 100 is also internally provided with a synchronization shaft 117, which is located outside the differential housing and on the same side of the left half-axle torque increasing gear 109 and the right half-axle torque increasing gear 114, and which is provided with a synchronization gear 120 which meshes with the ring gear 107; a left torque increasing free gear 121 and a right torque increasing free gear 122 are respectively provided on left and right sides of the synchronization shaft 117, wherein the left torque increasing free gear 121 meshes with the left half-axle torque increasing gear 109, and the right torque increasing free gear 122 meshes with the right half-axle torque increasing gear 114; the synchronization shaft 117 is also provided with a left two-way overrunning device 123 and a right two-way overrunning device 124, wherein the left two-way overrunning device 123 is arranged outside the left torque increasing free gear 121, and the right two-way overrunning device 124 is arranged outside the right torque increasing free gear 122.

The left half-axle connecting pipe 110 is located outside the left half-axle torque increasing gear 109, and the left connecting shaft 108 is fixedly connected to a left half-axle 111 through the left half-axle connecting pipe 110.

The differential capable of automatically restricting a differential ratio and increasing torque provided by the embodiment of the present disclosure also includes a radial power input shaft 118, and a bevel gear 119 at an end of the radial power input shaft 118 meshes with the bevel gear ring 112.

The right half-axle connecting pipe 115 is located outside the right half-axle torque increasing gear 114, and the right connecting shaft 113 is fixedly connected to a right half-axle 116 through the right half-axle connecting pipe 115.

In the differential capable of automatically restricting a differential ratio and increasing torque provided by the embodiment of the present disclosure, the left two-way overrunning device 123 and the right two-way overrunning device 124 both include an outer ring 125, rollers 126, roller holders 127, an inner ring 128, and a lagging direction control disc 129, wherein the inner ring 128 is fixedly connected to the synchronization shaft 117, the rollers 126 and the roller holders 127 are all arranged in an annular working gap formed between the inner ring 128 and the outer ring 125, and the rollers 126 and the roller holders 127 are arranged at intervals; the lagging direction control disc 129 is arranged on side surfaces of the outer ring 125 and the inner ring 128 and is configured to manage the roller holders 127 and the rollers 126; the left two-way overrunning device 123 and the right two-way overrunning device 124 further include retainers 130 made of an elastic material, which serve to enable the roller holders 127 to make the corresponding rollers 126 closely abut against an inner wall of the outer ring 125 and an outer wall of the inner ring 128, so that the safety and reliability are improved to a certain extent, thereby prolonging the service life of the left two-way overrunning device 123 and the right two-way overrunning device 124.

The outer ring 125 of the left two-way overrunning device 123 is fixedly connected with a left end face of the left torque increasing free gear 121, and the outer ring 125 of the right two-way overrunning device 124 is fixedly connected with a right end face of the right torque increasing free gear 122.

In the differential capable of automatically restricting a differential ratio and increasing torque provided by the embodiment of the present disclosure, the two-way overrunning devices arranged therein (i.e., the left two-way overrunning device 123 and the right two-way overrunning device 124) operate under the following working principle: when the synchronization shaft 117 is not rotating, the half-axles at both ends (i.e., the left half-axle 111 and the right half-axle 116) will not rotate, and the two-way overrunning devices do not work; if the vehicle moves forward or backward, the synchronization shaft 117 will rotate in a certain direction, and the lagging direction control discs 129, when applied certain friction forces from the outside, will make the roller holders 127 and the rollers 126 lag behind by an angle in a direction opposite to the rotation direction of the synchronization shaft 117 before rotating with the synchronization shaft 117 and the inner rings 125. The half-axles rotate under the action of the planetary gear of the differential, and the half-axles at both ends are connected with the synchronization shaft by gears. At this point, under normal conditions, the torque increasing free gears on the synchronization shaft (i.e., the left torque increasing free gear 121 and the right torque increasing free gear 122) have a higher rotational speed than that of the synchronization shaft 117, and the two-way overrunning devices are in an overrunning state. When the rotational speed of the other half-axle accelerates due to the increase in the slip rate, the rotational speed of the half-axle decreases and the rotational speeds of the torque increasing free gears on the synchronization shaft are close to or lower than that of the synchronization shaft, and the backstop characteristic of the two-way overrunning devices on the synchronization shaft make the half-axle and the synchronization shaft rotate at the same speed. When the slip rate of the other half-axle decreases and the rotational speed decreases, the increase in the rotational speed of the half-axle makes the rotational speeds of the torque increasing free gears on the synchronization shaft higher than that of the synchronization shaft, and the two-way overrunning devices are in the overrunning state. The rotation direction of the synchronization shaft automatically determines the working directions of the two-way overrunning devices.

Differentials in various parts determine the speed ratio of the synchronization shaft and the torque increasing free gear by the differential ratio. The power of the central differential can be axially input via the synchronization shaft. The power of the steering axle differential and the rear-axle differential can be radially input via a planet carrier. Taking a rear-axle driving vehicle which is travelling forward as an example, with reference to FIG. 1: the input power drives the left and right half-axles and wheels through the planet carrier, the synchronization shaft rotates under the action of the synchronization gear (which is fixedly connected to the synchronization shaft), and the torque increasing free gears on the synchronization shaft rotate under the action of the half-axle torque increasing gears. At this point, the rotational speeds of the torque increasing free gears at both ends are higher than that of the synchronization shaft, so they are in a free overrunning state. When the rotational speed of the torque increasing free gear at one end is close to that of the synchronization shaft, the wheel is necessarily in the smallest turn when in a pure rolling state, and meanwhile the outside wheel has a slip rate when travelling on the highest slope of undulating road surface or when a wheel has a small road adhesion. When the slip rate increases, the rotational speed of the torque increasing free gear at one end may be less than the rotational speed of the synchronization shaft, but due to the backstop effect of the one-way bearing, the synchronization shaft drives the torque increasing free gear to make the wheel half-axle having a smaller rotational speed (the wheel half-axle having a larger road adhesion) to continuously rotate via the half-axle torque increasing gear. At this point, the forward travelling speed of the vehicle is slower, but the wheel half-axle having a larger road adhesion has a greater torque to support rotation. The left and right half-axles and the wheels will not be constrained by friction or locking and are in a state of freely distributing power. Once the slip rate of the wheel decreases or the turning radius of the vehicle increases, the one-way bearings at both ends of the synchronization shaft are in an overrunning state.

Differentials in other parts are similar, and any wheel with road adhesion will not lose power support and transmission under any circumstances.

The differential ratio in the differential capable of automatically restricting a differential ratio and increasing torque provided by the embodiment of the present disclosure is: the maximum possible speed difference of the wheels in the pure rolling state should occur when the wheel is turning with the smallest radius and meanwhile there is the highest slope of undulating road surface on the outer side. Of course, the wheelbases, track widths and steering angles of different vehicles determine their minimum turning radii. The differential ratio of the central differential is the rear-axle speed/ the rear-axle speed plus the steering axle speed, which is about 0.9; the differential ratio of the steering axle differential is the inner side speed/the inner inside speed plus the outer side speed, which is about 0.9; and the differential ratio of the rear-axle differential is the inner side speed/the inner inside speed plus the outer side speed, which is about 0.8.

The slip rate in the differential capable of automatically restricting a differential ratio and increasing torque provided by the embodiment of the present disclosure is: wheel speed minus forward speed/wheel speed (corresponding to the maximum possible speed difference of the wheels in the pure rolling state).

The differential capable of automatically restricting a differential ratio and increasing torque provided by the embodiment of the present disclosure will inherit the advantages of the differentials and the differential locks and shield the disadvantages of the differentials and the differential locks. At the moment when power is transmitted to the drive axles and wheel half-axles running at different rotational speeds, if the wheel adhesion to road surface is reduced or becomes zero when the vehicle is travelling on muddy, icy, snowy, or cross-axle road surfaces, the differential will maintain certain rotational speeds of other wheels having road adhesion or drive axle and will transmit automatically increasing torque uninterruptedly and rigidly. Since the change of the working mode of the differential is not limited by speed conditions, the differential does not require reaction time and process and manual manipulation. It can generate continuous traction on various complex road surfaces or alternately changing terrains, and in combination with the kinematic potential energy, can express a new level of travelling ability of wheeled vehicles.

The differential capable of automatically restricting a differential ratio and increasing torque provided by the embodiment of the present disclosure is described in an example in which a low-speed power output half-axle is restricted. Of course, a high-speed power output half-axle can also be restricted. The design of the differential ratio is determined by the position of the differential and the maximum speed difference when it is acting.

In the differential capable of automatically restricting a differential ratio and increasing torque provided by the embodiment of the present disclosure, for the two-way overrunning device used therein, the working directions thereof are automatically determined by the rotation direction of the synchronization shaft under the action of the lagging direction control discs. Of course, the role of one two-way overrunning device in the present disclosure can also be completed by two one-way overrunning devices (one-way bearings).

The differential capable of automatically restricting a differential ratio and increasing torque provided by the embodiment of the present disclosure has the following application significance.

At the moment when power may be transmitted to the drive axles and wheel half-axles running at different rotational speeds, if the wheel adhesion to road surface is reduced or becomes zero when the vehicle is travelling on muddy, icy, snowy, or cross-axle road surfaces, the differential will maintain certain rotational speeds of other wheels having road adhesion or drive axle and will transmit automatically increasing torque uninterruptedly and rigidly. Since the change of the working mode of the differential is not limited by speed conditions, the differential does not require reaction time and process and manual manipulation. It can generate continuous traction on various complex road surfaces or alternately changing terrains, and in combination with the kinematic potential energy, can express a new level of travelling ability of wheeled vehicles.

In the differential capable of automatically restricting a differential ratio and increasing torque provided by the embodiment of the present disclosure, the power input shaft can transmit power without manipulation on various complex road surfaces (non-road surfaces). Of course, the power input shaft can also be used to restrict speeds of wheels or brake the wheels on complex road surfaces (can prevent unilateral locking of the brake), especially for applications where electromagnetic braking or hydraulic braking (frictionless braking) that requires a large installation space.

Although the present disclosure has been described in detail above with general descriptions and specific embodiments, some modifications or improvements can be made on the basis of the present disclosure, which is obvious to those skilled in the art. Therefore, these modifications or improvements made without departing from the spirit of the present disclosure all belong to the scope of protection of the present disclosure.

What is claimed is:

1. A differential capable of automatically restricting a differential ratio and increasing torque, comprising a case, in which a differential housing is arranged, wherein the differential housing is internally provided with a planetary gear, a planetary shaft, a left half-axle gear and a right half-axle gear, the planetary gear is arranged on the planetary shaft, the planetary gear meshes with the left half-axle gear and the right half-axle gear respectively, and the differential housing comprises a left housing and a right housing that fit with each other, and wherein:
- a ring gear is arranged at one end of the left housing that fits with the right housing in an outer circumferential direction, the left half-axle gear is arranged in the left housing, a left end of the left half-axle gear is fixedly connected with a left connecting shaft that extends outward, and the left connecting shaft is provided with a left half-axle torque increasing gear and a left half-axle connecting pipe;
- a bevel ring gear is arranged at one end of the right housing that fits with the left housing in an outer circumferential direction, the right half-axle gear is arranged in the right housing, a right end of the right half-axle gear is fixedly connected with a right connecting shaft that extends outward, and the right connecting shaft is provided with a right half-axle torque increasing gear and a right half-axle connecting pipe;
- the case is also internally provided with a synchronization shaft, which is located outside the differential housing and on the same side of the left half-axle torque increasing gear and the right half-axle torque increasing gear, and which is provided with a synchronization gear which meshes with the ring gear; a left torque increasing free gear and a right torque increasing free gear are respectively provided on left and right sides of the synchronization shaft, wherein the left torque increasing free gear meshes with the left half-axle torque increasing gear, and the right torque increasing free gear meshes with the right half-axle torque increasing gear; the synchronization shaft is also provided with a left two-way overrunning device and a right two-way overrunning device, wherein the left two-way overrunning device is arranged outside the left torque increasing free gear, and the right two-way overrunning device is arranged outside the right torque increasing free gear.

2. The differential capable of automatically restricting a differential ratio and increasing torque according to claim 1, wherein the left half-axle connecting pipe is located outside the left half-axle torque increasing gear, and the left connecting shaft is fixedly connected to a left half-axle through the left half-axle connecting pipe.

3. The differential capable of automatically restricting a differential ratio and increasing torque according to claim 1, further comprising a radial power input shaft, wherein a bevel gear at an end of the radial power input shaft meshes with the bevel gear ring.

4. The differential capable of automatically restricting a differential ratio and increasing torque according to claim 1, wherein the right half-axle connecting pipe is located outside the right half-axle torque increasing gear, and the right connecting shaft is fixedly connected to a right half-axle through the right half-axle connecting pipe.

5. The differential capable of automatically restricting a differential ratio and increasing torque according to claim 1, wherein the left two-way overrunning device and the right two-way overrunning device both comprise an outer ring, rollers, roller holders, an inner ring, and a lagging direction control disc, the inner ring is fixedly connected to the synchronization shaft, the rollers and the roller holders are all arranged in an annular working gap formed between the inner ring and the outer ring, and the rollers and the roller holders are arranged at intervals; and wherein the lagging direction control disc is arranged on side surfaces of the outer ring and the inner ring and is configured to manage the roller holders and the rollers.

6. The differential capable of automatically restricting a differential ratio and increasing torque according to claim 5, wherein the outer ring of the left two-way overrunning device is fixedly connected with a left end face of the left torque increasing free gear.

7. The differential capable of automatically restricting a differential ratio and increasing torque according to claim 5, wherein the outer ring of the right two-way overrunning device is fixedly connected with a right end face of the right torque increasing free gear.

* * * * *